March 10, 1931.  W. SUDEKUM  1,795,687
ROD PACKING
Filed Sept. 17, 1925
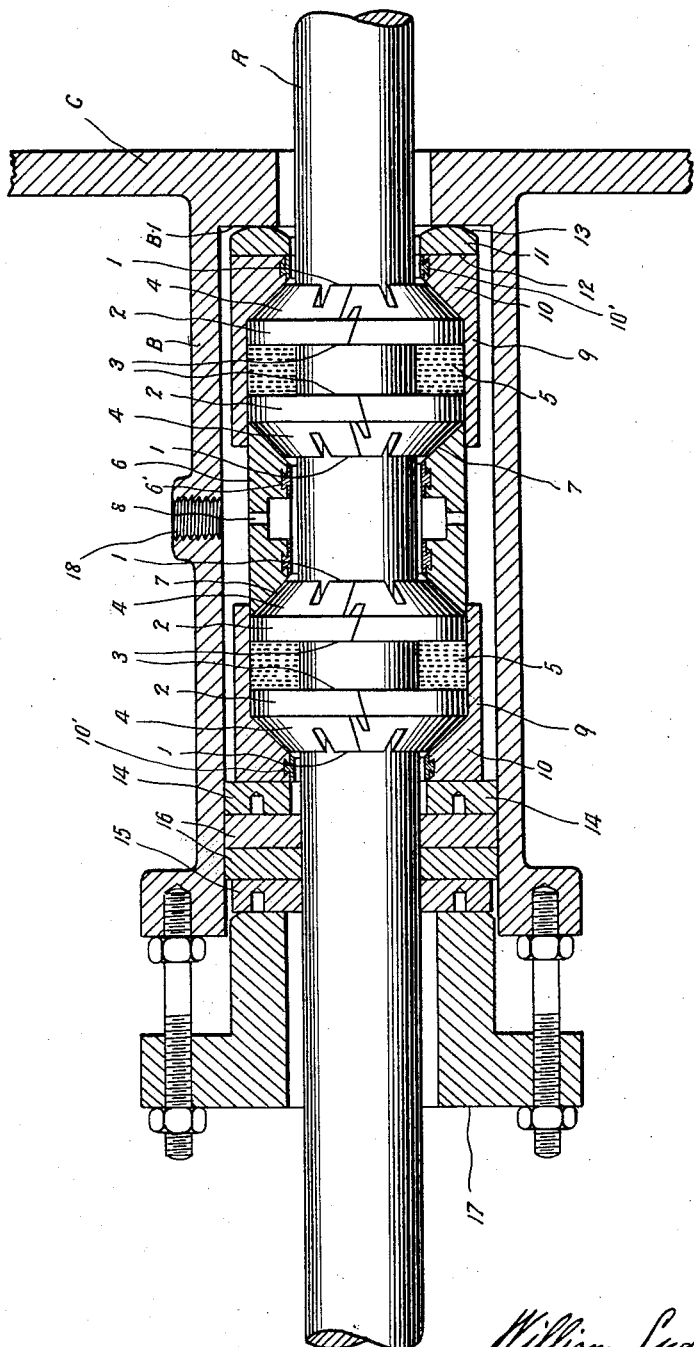
Inventor
William Sudekum
By Ogle R. Singleton.
Attorney Patented Mar. 10, 1931

1,795,687

UNITED STATES PATENT OFFICE

WILLIAM SUDEKUM, OF NASHVILLE, TENNESSEE

ROD PACKING

Application filed September 17, 1925. Serial No. 56,918.

My invention consists in a new and useful improvement in rod packing and is designed more particularly to furnish packing for the piston rods and valve stems of ammonia or other gas compressors, high pressure engines and pump, and constitutes a number of improvements over my invention described and claimed in United States Letters Patent Number 1,366,219, granted to me on January 18th 1921.

The particularly novel and useful features of this invention are the use of paired packing rings with interposed fibrous rings, the use of paired front rings with interposed resilient filler rings, and the use of a convex face upon the innermost ring in the stuffing box.

Experience in the use of my device shown in the patent above referred to has demonstrated that the fibrous rings adjacent the packing rings, being conically formed and bearing against the conical face of the packing rings, frequently become displaced when the rings are being adjusted. This defect has been remedied in my improved device by providing fibrous rings with straight faces interposed between the straight faces of the pairs of packing rings. Experience has also demonstrated that it is preferable to provide a pair of front rings, one spaced from the rod and the other spaced from the wall of the stuffing box, and resilient rings interposed between them. I have also found by experience that it is desirable to make the innermost ring in the box with a convex face and without fibrous packing.

The drawing is a longitudinal vertical section of a stuffing box equipped with my improved packing. The stuffing box B extending from the cylinder C, surrounds the piston rod R whereon are mounted divided metallic packing rings 1, each of which consists of two semi-annular inter-locking parts to facilitate their application to the rod R. Each of the rings 1 has an annular portion 2, a straight face 3 and an inclined face 4. These rings 1 are arranged upon the rod R in pairs, the straight faces 3 being opposed to each other, and between each pair I interpose a ring 5 of fibrous packing, which fits snugly upon the rod R. Between the two pairs of rings 1, I interpose a hollow cored vibrating gland 6 having concave faces 7 in which are received the inclined faces 4 of the rings 1, and having its inner face provided with the dove-tailed Babbitt metal 6'. The gland 6 is provided with an opening 8 for the purpose of permitting a lubricant supplied to the gland 6 to have access to the rod R. Surrounding the rings 1 and 5, I provide shells 9, each provided with an inwardly directed flange 10 bevelled to fit the inclined faces 4 of the ring 1. Each shell 9 is provided on its inner face with the dove-tailed Babbitt metal 10'. Between the flange 10 of the inner shell 9 and the inner wall B—1 of the stuffing box B, I provide a ring 11 having a straight face 12 opposed to the flange 10 of the shell 9 and a convexly curved face 13 opposed to the wall B—1.

Adjacent the flange 10 of the outer shell 9, I provide a non-resilient ring 14 fitted snugly within the stuffing box B and spaced from the rod R. I also provide a second non-resilient ring 15 fitted snugly to the rod R and spaced from the wall of the stuffing box B. Between these rings 14 and 15, I interpose two or more rings 16 made of any suitable resilient material, such as rubber, and fitted snugly to both the wall of the stuffing box B and the rod R. This construction provides means for clamping the shells 9 carrying the packing rings 1 and 5, in position. By designing and positioning the non-resilient rings 14 and 15 as described and illustrated in the drawing, the shaft R is allowed to vibrate, floating on the resilient rings 16. Bearing against the ring 15, I provide any suitable form of follow-up bolted gland such as 17. The stuffing box B is provided with an inlet opening 18 to which a lubricant carrying pipe may be attached to supply a lubricant within the stuffing box B.

Having described my invention, what I claim is:

In a rod packing, the combination with a rod of a wall surrounding the rod; a packing ring snugly fitted to the rod; a shell surrounding said packing ring and spaced from said rod and said wall; a ring spaced from said rod, fitted closely to said wall, and bearing against said shell; two resilient rings fitted closely to both the rod and the wall, and bearing against said last mentioned ring; a fourth ring spaced from said wall, fitted closely to said rod, and bearing against said resilient rings, all of said rings and said shell being slidably relative to said rod; and a follow-up mounted on said wall and bearing against said last mentioned ring.

In testimony whereof I affix my signature.

WILLIAM SUDEKUM.